Feb. 9, 1932.  L. S. HAMER  1,844,159
VALVE FOR PUMPS OR THE LIKE
Filed July 25, 1928
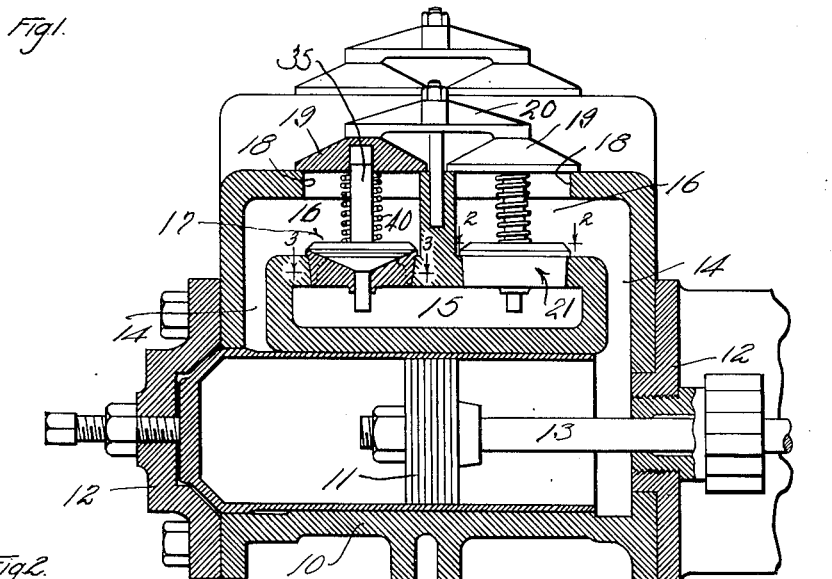
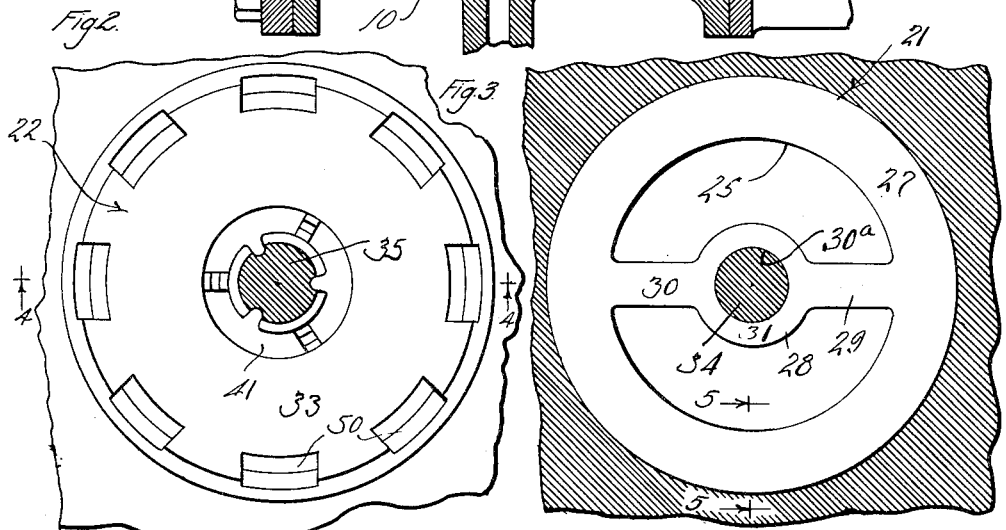
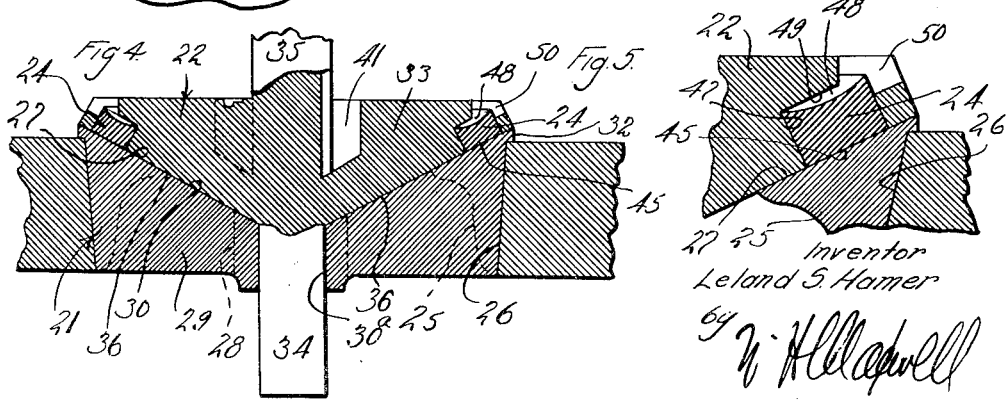
Inventor
Leland S. Hamer
by V. H. Caldwell
his Attorney Patented Feb. 9, 1932

1,844,159

UNITED STATES PATENT OFFICE

LELAND S. HAMER, OF LONG BEACH, CALIFORNIA, ASSIGNOR TO HAMER OIL TOOL COMPANY, LIMITED, OF LONG BEACH, CALIFORNIA, A CORPORATION OF DELAWARE

VALVE FOR PUMPS OR THE LIKE

Application filed July 25, 1928. Serial No. 295,245.

This invention has to do with a valve suitable for use in a pump, or the like, and it is an object of the invention to provide a simple, efficient, and dependable valve of this character.

Pump valves, and particularly slush pump valves, handling high pressures and fluid containing solid matter, give considerable trouble due largely to the packing means cutting out and to the parts wearing excessively. Further, valves ordinarily used in pumps of the character mentioned are more or less complicated and expensive of manufacture. Such valves usually embody several parts that have to be screw threaded or otherwise connected together and which require considerable machine work or finishing.

It is an object of this invention to provide a valve suitable for a slush pump, or the like, having packing means which is protected against wear and against being injured or cut out.

Another object of the invention is to provide a valve of the character mentioned in which the moving part or valve proper is a solid or unitary member simple in form and very inexpensive of manufacture.

It is a further object of this invention to provide a mounting for packing means in a valve whereby the pressure coming on the valve operates to make the packing tight in the valve and on the seat.

The various objects and features of my invention will be best and more fully understood from the following detailed description of a typical form and application of the invention, throughout which description I refer to the accompanying drawings, in which:

Fig. 1 is a longitudinal detailed sectional view of a typical slush pump showing it equipped with valves embodying the present invention. Fig. 2 is an enlarged plan section of the valve taken substantially as indicated by line 2—2 on Fig. 1. Fig. 3 is an enlarged detailed plan section taken substantially as indicated by line 3—3 on Fig. 1. Fig. 4 is a detailed sectional view of the valve taken as indicated by line 4—4 on Fig. 2, and Fig. 5 is a detailed sectional view taken as indicated by line 5—5 on Fig. 3.

The valve provided by this invention is intended primarily for use in slush pumps, or the like, and therefore I will describe it as applied to a typical slush pump. The pump illustrated comprises, generally, a cylinder 10, a piston 11 operable in the cylinder, heads 12 closing the ends of the cylinder, a connecting rod 13 connected to the piston and projecting through one of the heads, ports 14 connecting into the ends of the cylinder, and a more or less usual arrangement of halves, manifolds, etc. In Fig. 1 of the drawings the section is taken through the intake manifold 15 of the pump. The drawings show the manifold 15 connected with the ports 14 through valve chambers 16, the passage between the manifold 15 and chambers 16 being under control of inlet valves 17 embodying the present invention. The chambers 16 have top openings 18 to admit the valve 17 into place, the openings 18 being closed by detachable caps 19 held by clamps 20.

I will proceed with a description of a single valve 17, it being understood that such description applies to both valves and that the valve may be used as an intake or as an outlet valve.

The valve provided by my invention includes, generally, a seat 21 to be mounted stationary in the pump, a movable part or valve proper 22, and packing means 24 operating to seal or pack between the valve 22 and seat 21 when the valve is closed.

The seat 21 includes an annular body or ring 25 adapted to be seated tightly in an opening 26 provided in the pump between the manifold 15 and valve chamber 16. The upper end or face 27 of the seat ring 25 is finished to form a seat for the valve 22. In accordance with my invention, the face or seat 27 of the seat ring is tapered or shaped to extend inwardly and downwardly as clearly illustrated in Figs. 4 and 5 of the drawings. The seat 21 is further provided with a central guideway 28 for the guide part of the valve 22 and with spaced ribs 29 which support the guideway 28 in the ring 25. The guideway 28 may be in the form of a collar or sleeve having an opening 30ª to slidably pass the guide of the valve to be hereinafter described. In practice there are two supporting ribs 29 located diametrically opposite each other and operating to support the guideway 28 centrally in the seat ring 25. In practice the ring 25, guideway 28, and ribs 29 are cast or formed integrally. Further, in accordance with the invention the upper faces 30 and 31 of the ribs 29 and guideway 28, respectively, are pitched or angularly disposed to correspond with and be in line with the face or seat 27 of the seat ring 25. This formation or arrangement of parts is clearly illustrated in Fig. 4 of the drawings. In practice a suitable flange 32 is provided on the upper end of the ring 25 to limit the downward movement of the ring in the opening 26.

The movable part, or valve proper 22, comprises, generally, a head 33, a guide 34 projecting downwardly from the head to operate in the guideway 28, and a stem 35 projecting upwardly from the head to cooperate with a cap 19 or other part that may be provided as an upper guide for the valve. The head 33 has its entire under or lower side finished to present a conical or downward and inwardly tapered face 36 to seat on the face 27 of the ring 25 and the upper parts or faces 30 and 31 of the ribs 29 and guideway 28, respectively. I have found that the downward and inward or conical shaping of the valve face 36 is effective in directing the flow of fluid through the valve so that the valve offers a minimum resistance to the flow of fluid and in cooperating with the parts of the seat. By having the valve seat on the ribs 29 and guideway 28 as well as on the face 27, it has a large supporting or bearing area.

The guide 34 projects downwardly from the center or apex of the conical face 36 of the valve and is made to slidably fit the opening 30ª in the guideway 28. The guide 34 is made sufficiently long to remain in proper engagement with the guideway throughout operation of the valve.

The stem 35 projects upwardly from the top or upper side of the head 33 and fits the cap 19. The stem 35 may form a guide for an operating spring 40, as clearly shown in Fig. 1 of the drawings. In practice the upper side of the valve body 33 may be flat and may be provided with recesses 41 for the purpose of lightening the construction.

In accordance with the present construction, the valve just described, that is the head 33, guide 34 and stem 35, are formed integral or are in the nature of a single casting or forging thus eliminating the necessity of threading or connecting the various parts together.

The packing means 24 provided by my present invention is in the form of a single annular body or ring of rubber, or the like, mounted in a recess formed in the face 36 of the valve 32 opposite the seat 27 of the ring 25. The packing ring is substantially square in cross section and its lower or working face 45 is disposed to coincide with the face 36 of the valve. The recess formed in the face of the valve has side walls 47 substantially perpendicular to the face 36, as clearly shown in Figs. 4 and 5 of the drawings. The back or inner side of the packing ring is recessed or provided with a groove 48 forming a space between the packing ring and the bottom 49 of the recess in the valve. The invention provides a plurality of openings 50 in the top of the valve head 33 communicating with the recess which carries the packing ring. The openings 50 may be located around the valve head, as shown in Fig. 2, and are located so that they form openings to the space between the rubber and the bottom of the recess and to the side of the rubber which engages the outermost wall 47 of the recess. With this formation of parts, pressure coming on the valve when the valve is closed is admitted back of the packing ring and to the outermost side of the packing ring so that the packing ring is forced downwardly on the seat 27 and inwardly against the inner wall 47 of the recess in the valve head. In this way the pressure coming on the valve is utilized in holding the packing ring tight on the seat to provide a sealing engagement with the seat and in holding the ring tight against one wall of the recess to thus hold the ring tight in the recess.

The packing ring being substantially square in cross section and having its face 45 formed in the plane of the face of the valve, it is necessary to spring the rubber somewhat in order to place it in the recess in the valve head. It will be apparent that the shape of the packing ring further operates to cause the ring to remain in place in its recess.

In operation, the valve is arranged in a pump in a manner such as I have illustrated in Fig. 1, and when seated as shown in the drawings, the head 33 is effectively supported on the ring 25, ribs 29, and guideway 28, and the packing ring is urged against the face of the seat ring and is held in the recess in the valve head by the pressure coming on the valve. When the valve is open, or away from the seat, the conical lower face 36 allows free passage of the fluid. The packing rubber or ring being in the body with its face 45 flush with the face of the valve, is protected against being cut or injured by the flow of fluid past the valve. It has been found by practical use that the rubber will wear very much longer than will the rubber in the ordinary valve construction now in use.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A valve of the character described having a head with a conical seating face provided with an annular recess, and a rubber packing ring carried in the recess, the head having a plurality of spaced openings extending between the back of the head and the bottom and outer side of the recess.

2. A valve of the character described including, a head with a conical seating face provided with an annular recess having side walls substantially normal to the seating face, and a rubber packing ring carried in the recess having sides fitting against the said side walls and having a concaved inner end forming a space between the ring and the bottom of the recess, the head having a plurality of spaced openings extending between the back of the head and the bottom and outer side of the recess.

3. A valve of the character described including, a head with a conical seating face provided with an annular recess, and a rubber packing ring carried in the recess having an outer end parallel to the seating face and having an annular groove in its inner end, there being spaced openings in the head extending between the back of the head and the bottom and outer side of the recess.

4. A valve of the character described having a head with a conical seating face provided with an annular recess, and a rubber packing ring carried in the recess, the head having a plurality of circumferentially elongated spaced openings extending between the back of the head and the bottom and outer side of the recess.

5. A valve of the character described having a head with a conical seating face provided with an annular recess, and a rubber packing ring carried in the recess, the head having a plurality of spaced openings extending from the line of joinder of the periphery and the back of the head and the bottom and outer side of the recess.

In witness that I claim the foregoing I have hereunto subscribed my name this 22nd day of June, 1928.

LELAND S. HAMER.